United States Patent [19]

Chater et al.

[11] Patent Number: 4,605,350
[45] Date of Patent: Aug. 12, 1986

[54] EXPANSION SHELL

[76] Inventors: Izak Chater, 25 Robin Street; Allan H. G. Brown, 35 Marilyn Street, both of Flamwood, Klerksdorp, South Africa

[21] Appl. No.: 545,273

[22] Filed: Oct. 25, 1983

[51] Int. Cl.[4] .............................. F16B 13/04
[52] U.S. Cl. ................................ 411/75; 411/60
[58] Field of Search ............ 411/21, 24, 28, 53, 411/60, 75, 76, 63, 77, 78, 79, 80, 25, 26, 27, 479

[56] References Cited

U.S. PATENT DOCUMENTS

| | | | |
|---|---|---|---|
| 317,448 | 5/1885 | Evans | 411/53 |
| 796,262 | 8/1905 | Steward | 411/61 |
| 1,316,640 | 9/1919 | Parsons | 411/78 |
| 1,649,160 | 11/1927 | Fisher | 411/63 |
| 1,993,749 | 3/1935 | Pleister | 411/76 |
| 2,004,480 | 6/1935 | Pleister et al. | 411/76 |
| 2,177,138 | 10/1939 | Hollander | 411/79 |
| 3,339,449 | 9/1967 | Lerich | 411/53 |
| 3,342,097 | 9/1967 | Rocheleau | 411/76 |

FOREIGN PATENT DOCUMENTS

| | | | |
|---|---|---|---|
| 1025707 | 2/1978 | Canada | 411/80 |
| 470800 | 6/1914 | France | 411/60 |
| 1186185 | 2/1959 | France | 411/60 |

Primary Examiner—Thomas J. Holko
Attorney, Agent, or Firm—Spencer & Frank

[57] ABSTRACT

A shell for use in expansion assembly which comprises a member of generally tubular shape, the member having a first end which is inclined to its longitudinal axis and being formed with at least a first line of weakness in its wall which extends in the axial direction of the member.

6 Claims, 5 Drawing Figures

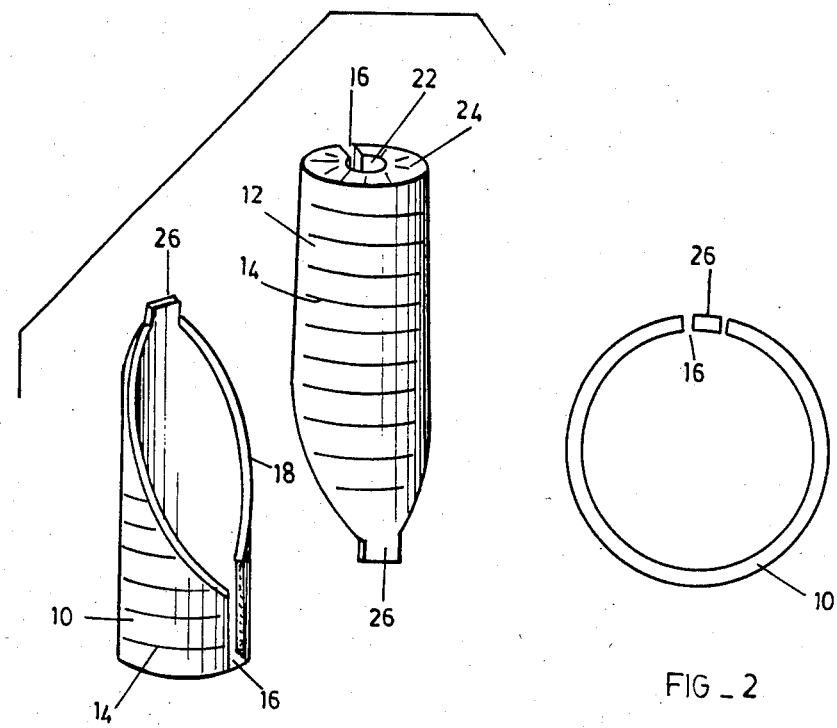
FIG_1
FIG_2
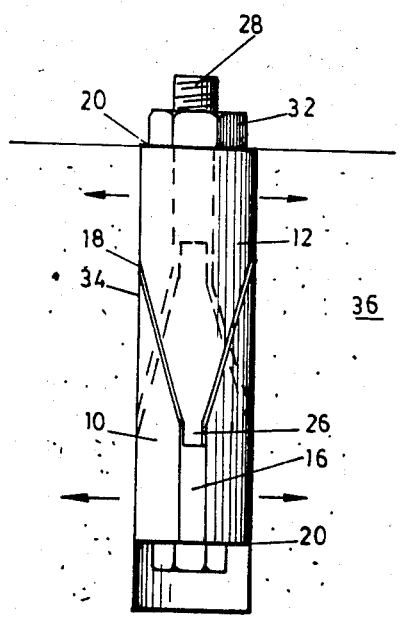
FIG_3
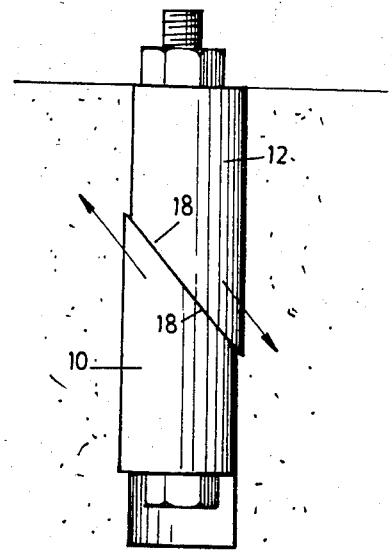
FIG_4

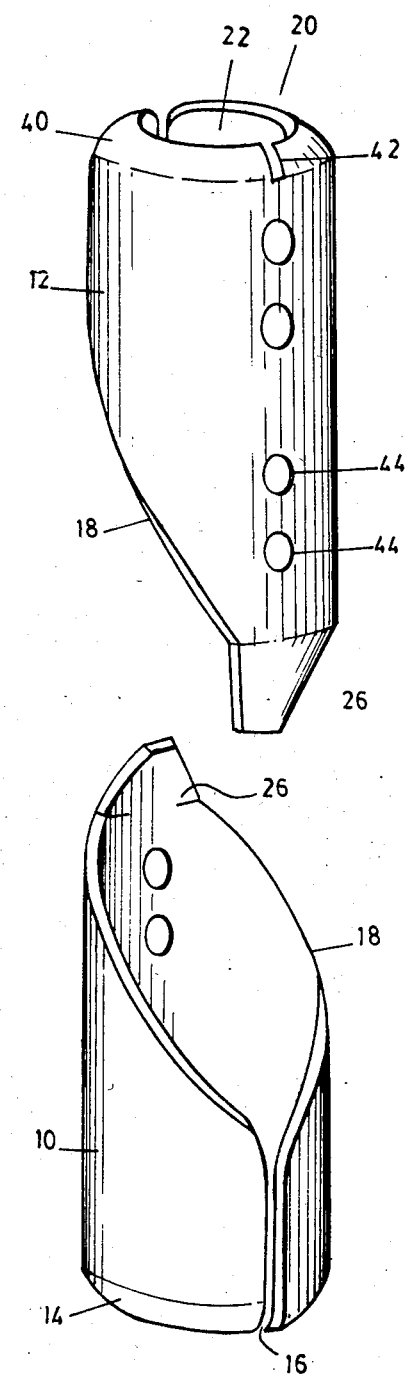
FIG_5

EXPANSION SHELL

BACKGROUND OF THE INVENTION

This invention relates generally to a shell suitable for use in an expansion assembly of the type used for anchoring studs or bolts in solid materials such as concrete, rock, steel, brick, wood, and the like, and suitable for use in a rockbolt or similar mechanism used for reinforcing rock.

SUMMARY OF THE INVENTION

The invention provides a shell for use in an expansion assembly which comprises a member of generally tubular shape, the member having a first end which is inclined to its longitudinal axis and being formed with at least a first line of weakness in its wall which extends in the axial direction of the member.

The first line of weakness may be formed by a slot or any suitably dimensioned aperture in the wall of the member. The slot may be formed by an opening which extends from one end of the member to the other end of the member. Conveniently, if the shell is formed from sheet metal, the sheet metal is deformed into a tubular shape and the slot i.e. the first line of weakness is formed by opposing ends of the sheet metal piece.

The first line of weakness is preferably located at a position where the wall of the member has substantially its shortest axial length.

The shell may be formed with a second line of weakness in the wall of the member which extends in the axial direction of the member. The second line of weakness may be located at a position where the wall of the member has substantially its greatest axial length and the second line of weakness may be substantially diametrically opposed to the first line of weakness.

The second line of weakness may comprise at least one hole, and preferably a plurality of in line holes, formed through the wall of the member.

The tubular member may include a formation which projects from the inclined first end of the member at a position where the wall of the member has substantially its greatest axial length, the formation being inclined to the longitudinal axis of the tubular member.

The opposing end of the tubular member may be substantially at right angles to the longitudinal axis of the member and may be formed to define an aperture which is of smaller area than the internal cross sectional area of the tubular member. The aperture may be formed by shaping the material of the tubular member axially inwardly.

At least one slot may be formed in the edge of the tubular member adjacent the aperture. This slot is preferably in line with the second line of weakness.

Two of the shells described may be combined with an elongate member such as a bolt or cable to form an expansion assembly. The elongate member passes through the two shells which are arranged so that their first ends respectively are opposed to and in contact with each other.

The elongate member may include spaced means in contact with the remote ends of the two shells respectively. This means may comprise, for example, nuts which are threadedly engaged with the elongate member, clamps which are secured to the elongate member, or any other device or combination of devices which are secured to the elongate member or which form part of the elongate member and which provide enlarged areas which bear on the remote ends of the shells.

The invention also extends to an expansion assembly which includes at least first and second shells which are radially expansible and an elongate member which extends axially through the shells and which in use forces the shells together axially, the first shell having a surface which is inclined to the elongate member and which is in contact with a complemental surface on the second shell.

BRIEF DESCRIPTION OF THE DRAWINGS

The invention is further described by way of examples with reference to the accompanying drawings in which:

FIG. 1 is a perspective view of two shells in accordance with the invention,

FIG. 2 is a view of an end of one of the shells of FIG. 1,

FIG. 3 illustrates an initial stage in the installation of an expansion assembly formed with the shells of FIG. 1, FIG. 4 is a view at right angles of the assembly of FIG. 3 illustrating the lateral movement of the shells as the expansion assembly is anchored in position, and, FIG. 5 illustrates two shells in accordance with a modification of the invention.

DESCRIPTION OF PREFERRED EMBODIMENTS

FIG. 1 illustrates two shells 10 and 12 respectively which are formed with serrations 14 on their outer surfaces. The shells are formed from metal pressings which are shaped into a tubular form as illustrated in the drawing. Opposing ends of the metal pressing define a slot 16 in each of the shells respectively with the slot being located at a position which coincides with the shortest axial length of the tubular member and extending from one end of the tubular member to the other. The slot 16 constitutes a line of weakness in the shell.

Each of the shells has a surface or end 18 which is inclined to its longitudinal axis and an opposing end 20 which is substantially at right angles to the longitudinal axis. As illustrated the ends 20 are deformed radially inwardly so as to define a hole 22 which is of smaller diameter than the internal diameter of the shell. Serrations 24 are formed on the metal of the shell around the hole 22.

Each of the shells has a formation 26 which protrudes from the sloping end 18 and which is inclined slightly inwardly towards the central longitudinal axis of the shell. The formation 26 is located at a position which coincides with the longest axial dimension of the shell.

The shells are used by aligning them axially with one another and then passing a bolt or cable or similar elongate member through the registering holes 22 in the ends. The shells are positioned on the bolt so that the inclined surfaces 18 are complemental to and in contact with one another. The protruding formations 26 then enter the slots 16 with the shoulders of the formations engaging with the edges of the slots.

FIG. 3 illustrates the use of an expansion assembly formed with two shells 10 and 12 and a bolt 28 in the manner described. The bolt has a head 30 which engages with the head 20 of the lower shell and a nut 32 which engages with the end 20 of the upper shell. The assembly is inserted into a hole 34 formed in a material 36. It can clearly be seen in this drawing that the two sloping faces 18 are in contact with each other and the protruding formation or tongues 26 extend into the respective slots 16.

A washer is normally employed between the nut 32 and the opposing end 20 of the assembly. As the nut 32 is tightened on the threaded shank of the bolt 28 the head 30 engages with the serrations 24 on the end 20 of the other shell and is prevented from turning. The two shells are therefore forced together in the axial direction of the bolt 28. As the shells are forced together the protruding formation 26 of each shell enters the slot 16 of the other shell and thereby expands the shell radially while it undergoes a similar expansion. In addition, as shown in FIG. 4, the two inclined faces 18 of the shells slide across one another and the shells are displaced relatively to each other in the radial direction of the bolt.

The simultaneous radial expansion of each shell together with the relative lateral displacement of the shells provides a very firm secural of the shells in the hole making the expansion assembly of the invention suitable for use as as industrial anchor, roof bolt, or any other fixing device.

The shells have been described as being made of pressed metal but could alternatively be cast, or made from a suitable plastics or plastics reinforced material. The shells are inexpensive to manufacture and may be used with standard bolts and nuts.

FIG. 5 illustrates a variation of the invention. The shells designated 10 and 12 respectively are formed generally in the manner described and have sloping ends 18 and opposed ends 20 which are substantially at right angles to their longitudinal axes. Each shell has a slot 16 extending along the wall of the shell at a position which coincides with the shortest axial length cf the wall of the shell. A protruding formation 26 extends from the sloping surface 18 and is inclined towards the central axis of the shell.

Each of the ends 20 defines a hole 22 through which a bolt or other elongate member passes in the manner described and the hole is formed by turning the metal at the end 20 radially inwardly so that it has a generally dome shaped 40. A slot 42 is formed in the end 20 in line with the protruding formation 26 and a number of holes 44 are formed through the wall of the material in line with the slot and the protruding formation.

The holes 44 and the slot 42 define a line of weakness which is diametrically opposed to the slot 16. Thus dur.ing use of the shell the formation 26 of one shell enters the slot 16 of an adjacent shell and causes the shell to expand radially. The material of the shell may provide substantial resistance to the radial expansion and the line of weakness formed by the holes 44 and the slot 42 is designed to facilitate the radial expansion. In other words the shell opens up radially during installation forming into two halves which are bent outwardly relatively to one another along the line of weakness. The line of weakness could be formed in any other way for example by a groove or slots in the wall of the shell but the line of weakness should not be so pronounced as to cause the shell to split into two under loading.

The domed shape 40 at the end 20 of the shell provides a firm surface on which axial force can be applied to the shell assembly. If the ends 20 are not strengthened in this way, or in any other equivalent way, there may be a tendency for the head or nut of the compressing bolt to pull through the end into the shell interior.

The invention has been described with respect to an industrial type fastener illustrated in FIGS. 3 and 4. The principles of the invention are equally applicable for use in a rock bolt of the type used in underground excavations. In this case the shank of the bolt is passed through the two shells, in a manner analogous to that described, but the shank carries a nut or other formation a short distance from the end of the bolt which is threaded which duplicates the function provided by the head 30, or the nut 32, as the case may be, shown in FIG. 3. In other words a rock bolt is formed with the aid of the shells of the invention by locating two of the shells on a threaded end of a bolt of a suitable length and compressing the shells axially by applying force to the shells with the aid of relatively movable members e.g. nuts which are located on the threaded end of the bolt. The end of the bolt which protrudes from a hole formed in the rock face may itself be threaded and be engaged with a load bearing washer and a nut.

If there is a tendency for the nut on the bolt to rotate while the shells are being compressed then nut may be fixed in any suitable way to its adjacent shell or alternatively, where the hole into which the expansion assembly is inserted is accurately sized then use may be made of a device which is wedged into the end of the hole and which engages with the nut thereby restraining it against rotation Many other variations of the invention are possible and these are all intended to fall within the scope of the invention.

We claim:

1. An expansion assembly which is adapted during use to be expanded into contact with the wall of a hole in which it is placed, comprising:

a first shell member of generally tubular shape, the member having a first end which is inclined to its longitudinal axis from a first position at which the wall of the member has substantially its greatest axial length to a second position, diametrically opposing the first position, at which the wall of the member has substantially its shortest axial length, the first end being disposed substantially in a plane, the member being formed with at least a first line of weakness in its wall which extends in the axial direction of the member and with a formation positioned at the first end where the wall of the member has substantially its greatest axial length, the formation projecting out of the plane of the first end;

a second shell member that is substantially identical to the first shell member; and an elongate member passing through the first and second shell members, the shell members being arranged so that their first ends respectively are opposed to and in contact with each other and so that the formation of each shell member engages the first line of weakness of the other shell member.

2. An expansion assembly according to claim 1 wherein the first line of weakness of each respective shell member is located at a position where the wall of the member has substantially its shortest axial length.

3. An expansion assembly according to claim 1 wherein the first line of weakness of each respective shell member is formed by a slot in the wall of the member.

4. An expansion assembly according to claim 1 wherein the wall of each respective shell member has a second line of weakness substantially diametrically opposed to the first line of weakness which extends in the axial direction of the member and which is located at a position where the wall of the member has substantially its greatest axial length.

5. An expansion assembly according to claim 4 wherein the second line of weakness of each respective shell member comprises a plurality of holes formed through the wall of the member.

6. An expansion assembly according to claim 1 wherein each respective shell member has a second end which is substantially at right angles to the longitudinal axis of the member, the second end being formed to define an aperture which is of smaller area than the internal cross sectional area of the member, the first line of weakness extending to the aperture.

* * * * *